US012792497B2

(12) United States Patent
Rashid et al.

(10) Patent No.: US 12,792,497 B2
(45) Date of Patent: Nov. 10, 2026

(54) SYSTEMS AND METHODS FOR TESTING SOFTWARE PROGRAMS

(71) Applicant: Capital One Services, LLC, McLean, VA (US)

(72) Inventors: Shahryar Rashid, McLean, VA (US); Alex Eringis, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 269 days.

(21) Appl. No.: 18/601,756

(22) Filed: Mar. 11, 2024

(65) Prior Publication Data

US 2025/0284614 A1 Sep. 11, 2025

(51) Int. Cl.
*G06F 11/3668* (2025.01)
*G06N 20/00* (2019.01)

(52) U.S. Cl.
CPC ...... *G06F 11/3684* (2013.01); *G06F 11/3688* (2013.01); *G06F 11/3692* (2013.01); *G06N 20/00* (2019.01)

(58) Field of Classification Search
CPC ............... G06F 11/3608; G06F 11/3668–3698
See application file for complete search history.

(56) References Cited

U.S. PATENT DOCUMENTS 7,779,374 B1 * 8/2010 Hamid ................ G06F 11/3676 716/136
2007/0174713 A1 * 7/2007 Rossi .................. G06F 11/3688 714/38.1

FOREIGN PATENT DOCUMENTS

WO WO-2009046525 A1 * 4/2009 ......... G05B 23/0278

OTHER PUBLICATIONS

Padmanabha, Anantha, et al. , Minimizing Test cases in Rest API Fuzzing, Second International Conference on Smart Technologies for Smart Nation (SmartTechCon), Aug. 2023, 6 pages, [retrieved on Jan. 29, 2026], Retrieved from the Internet: <URL: http://ieeexplore.ieee.org/>.*

* cited by examiner

*Primary Examiner* — Geoffrey R St Leger
(74) *Attorney, Agent, or Firm* — Foley & Lardner LLP

(57) ABSTRACT

Systems and methods for customizing the testing process of a software program. In some aspects, the system receives a set of requirements for a software program, including logical rules linking input values to output values of the software program. The system receives a set of failure types that correspond to previous deviations from the logical rules in the set of requirements. Based on the set of failure types and the set of requirements, the system generates a configuration file, including fixtures and validations, where the fixtures and validations describe logical relations between intermediate states of the software program during execution. Based on the configuration file, the system generates a plurality of test cases, including parameters and endpoints. Using the plurality of test cases, the system regulates the software program to produce output values from input values in accordance with the set of requirements.

20 Claims, 4 Drawing Sheets

100

```yaml
parameters:
  - name: "Accept"
    value: "application/json;v=3"
    type: "HEADER"
  - name: "userId"
    value: "${generatedUserId}"
    type: "PATH"
    match:
      op: "POST"
      path: "/api/create/{userId}/user"
      parameters:
        - name: "useMock"
          type: "HEADER"

endpoints:
  - match:
      op: "POST"
      path: "/api/create/{userId}/user"
    fixtures:
      - UserFixture
    validators:
      - UserValidator
```

202

204

206

208

FIG. 2

SYSTEMS AND METHODS FOR TESTING SOFTWARE PROGRAMS

BACKGROUND

Current methods for performing software testing on programs such as Application Programming Interfaces (APIs) are inflexible and only govern a straightforward relationship between inputs and outputs. The shortcoming with this approach is that such testing is insensitive to dependencies of outputs on internal programming states, and is therefore unsuitable to complex programs. For example, existing API testing methods do not capture the range of outputs respectively corresponding to different intermediate states of a program. The result is that current methods for API testing give an incomplete picture of possible failure points, and mis-diagnose software when it is running as intended.

SUMMARY

By contrast, the methods and systems disclosed herein use custom fixtures and validations to capture complex logical requirements on and relations between intermediate programming states from the program's input to its output. Conventional software testing methods only use pairs of input values and output values with little to no consideration for the process used by the software to compute the output. However, the methods herein use fixtures to describe and enforce logical requirements on the input values and intermediate programming states to verify that the software is behaving as intended at each intermediate step of its execution. Validations used by the methods herein enforce the logical relations between each functional component of software being tested, causing each intermediate state to correctly determine the next step of the software. The modular nature of testing based on the fixtures and validations of the systems and methods herein allows the testing process to scrutinize each component of a software program, resulting in much more precise control over problematic areas.

Additionally, the test cases generated based on the fixtures and validations can use parameters and endpoints to test the software program on data particularly important for the program to handle correctly. Parameters used by the methods and systems herein allow the testing process to target scenarios especially relevant to the deployment contexts of the software program. Custom data embodied by the parameters can be used in conjunction with endpoints verifying the integrity of intermediate programming states to ensure the program appropriately adapts its intermediate processes to a variety of complex situations. Conventional methods cannot enforce guidelines on changing intermediate processes or adapting programming states in unique situations, instead relying on a direct and simplistic relationship from input values straight to output values. The ability to test how the software program changes its intermediate or dependent programming states in response to changes to input data or parameters allow a greater extent of insight to the processing of difficult data by the software program.

The ability to customize testing to capture both the internal logic of the software program and its ability to handle specific inputs and program states allows the systems and methods to reach degrees of control and nuance not found elsewhere in software testing.

In some aspects, methods and systems are described herein comprising: receiving a set of requirements for a software program, wherein the set of requirements comprises logical rules linking input values to output values of the software program; receiving a set of failure types that correspond to previous deviations from the logical rules in the set of requirements; based on the set of failure types and the set of requirements, generating a configuration file, wherein the configuration file comprises fixtures and validations, wherein the fixtures define acceptable ranges for each intermediate state of the software program and wherein the validations describe logical relations between two or more intermediate states of the software program during execution; based on the configuration file, generating a plurality of test cases, wherein the plurality of test cases comprises parameters and endpoints generated based on the configuration file; and using the plurality of test cases, regulating the software program to produce output values from input values in accordance with the set of requirements.

Various other aspects, features, and advantages of the systems and methods described herein will be apparent through the detailed description and the drawings attached hereto. It is also to be understood that both the foregoing general description and the following detailed description are examples and are not restrictive of the scope of the systems and methods described herein. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 shows an illustration of a test case used to regulate a software program, in accordance with one or more embodiments.

DETAILED DESCRIPTION

In the following description, for the purposes of explanation, numerous specific details are set forth in order to provide a thorough understanding of the embodiments described herein. It will be appreciated, however, by those having skill in the art that the embodiments may be practiced without these specific details or with an equivalent arrangement. In other cases, well-known structures and devices are shown in block diagram form in order to avoid unnecessarily obscuring the embodiments.

Systems and methods herein are used to test software programs for adherence to a set of requirements. Using a set of failure types describing previous deviations of the software program from the set of requirements, the system may generate a configuration file. The configuration file contains restrictions on input values and the relations between input values, programming states, and output values. A programming state refers to a collection of information corresponding to data that the program is currently processing. The software program, during its execution, transforms from one programming state to another state. For example, the software may modify the value of a variable stored in memory. The altered variable value is then used to compute a function, the output for which is stored as data for the execution of the program. The software program changed from one programming state to another programming state via the modification of the variable, the activation of the function, and the creation of the output. The set of requirements may prescribe one or more logical rules restricting the transformation of one programming state to another. Using the configuration file, the system can generate a set of test cases, including parameters and endpoints. Using the set of test cases, the system can perform testing of the software program to bring it into alignment with the set of requirements.

Figure 1:
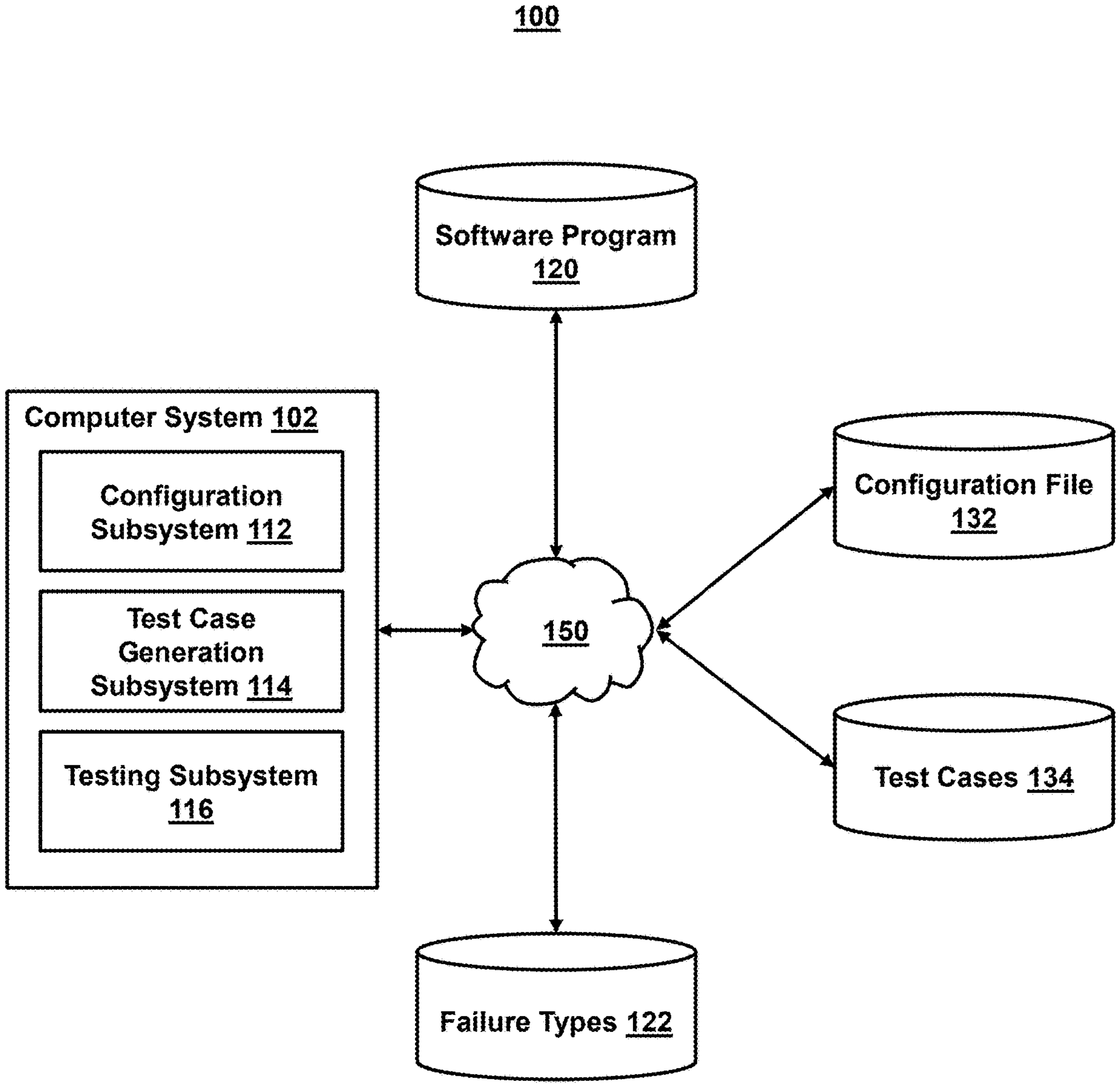
FIG. 1 shows an illustrative diagram for a system for designing a testing process for a software program, in accordance with one or more embodiments.

FIG. 1 shows an illustrative diagram for system 150 operating in Environment 100, which contains hardware and software components used to perform testing of software programs, in accordance with one or more embodiments. For example, Computer System 102, a part of system 150, may include Configuration Subsystem 112, Test Case Generation Subsystem 114, and Testing Subsystem 116. Additionally, system 150 may create, store, or retrieve elements of Environment 100 such as Software Program 120, Failure Types 122, Configuration File 132 and/or Test Cases 134.

The system may be used to test a software program (e.g., Software Program 120). For example, the system may receive a set of requirements for the software program, and the program is to be tested and/or modified to meet the set of requirements. As described herein, the set of requirements includes logical relations between input values and output values for the software program and/or specifications on how the software program processes data. For example, a set of requirements for an API program may specify the data that the API must retrieve in response to particular types of requests, the format in which the output must be delivered, and the databases to be used by the API in retrieving data. For example, the set of requirements may specify a target performance metric describing the accuracy with which the Software Program 120 responds to input values. In some embodiments, the set of requirements is in the format of an Open API specification, detailing the kinds of responses Software Program 120 must make to particular types of requests. A target performance metric specified by the set of requirements may require that Software Program 120 correctly respond to a proportion of all requests used in testing. In some embodiments, the set of requirements may contain one or more logical rules to be included as validations in the testing of Software Program 120.

The system may receive a set of failure types (e.g., Failure Types 122) corresponding to Software Program 120. The system may, for example, be used for supplemental testing in addition to a first round of initial calibration testing. The system may be designed to fine-tune the software program for particular challenges, and therefore may receive preconstructed data on the failures of the program. As referred to herein, the set of failure types can contain descriptions of types of input-output relationships from the set of requirements that Software Program 120 has failed to meet, or specific input values scenarios where Software Program 120 produced the wrong output. In some embodiments, the set of failure types may refer to categories of input values, output values or intermediate programming states that cause Software Program 120 to generate an error, including an execution error, a syntax error, a functional error, or a performance defect. Failure Types 122 may be generated as a result of preliminary testing (e.g., using Testing Subsystem 116). The preliminary testing may use a set of preliminary test cases identify weaknesses in Software Program 120. Failure Types 122 may include, for example, the preliminary test cases that Software Program 120 failed to pass. In some embodiments, the system may generalize Failure Types 122 to be types of deviations from the set of requirements as shown by the preliminary testing. For example, the system may conclude Failure Types 122 to be a missing-value type, a logical inconsistency type, a functional error type, a performance defect, or a syntax error, among other types. For example, if Software Program 120 failed a test case relating to the value of an output from a function, Failure Types 122 may capture the failed test case as a functional error type.

Based on Failure Types 122, the system (e.g., Configuration Subsystem 112) may generate a configuration file (e.g., Configuration File 132). The configuration file contains fixtures and validations designed to capture the desired relationships between input values, intermediate programming states, and output values. As described herein, fixtures are logical rules governing the ranges of acceptable values for one or more input values or intermediate states. For example, fixtures are logical rules constraining each program state in the software program. For an API program being tested, a fixture might limit the input values to a certain type of request. In another example, fixtures limiting a software program may specify a type for each input and/or intermediate state. For example, the fixtures may require a real number, a vector, and a data source for the input to a software program. The fixtures may require a Boolean value type for an output of an intermediary function in the software program. The fixtures may require an array of integers for the input of a different intermediary function in the software program. Additionally or alternatively, the fixtures may specify value ranges for programming states, such as requiring that a computational result be a real value between 0 and 1. Fixtures may also enforce formatting requirements for certain types of data, such as requiring dates to be entered as two digits for the day followed by two more digits for the month and four more digits for the year.

As described herein, validations are logical rules specifying relations between one or more program states in the software program. For example, a validation may regulate the relation between the activation of a first function and the activation of a second function. The second function is used only when the first function produces an output falling into a specified value range, for example. In some embodiments, validations often relate to internal states of programs during execution, and intermediate states may not be immediately obvious from the output of a software program. For example, a validation may specify that a neuron in a neural network may activate in response to a set number of neurons from the previous layer hitting an activation threshold. In another example, the system may use a first algorithm in response to a Boolean value of an intermediate state being true, and use a second algorithm in response to the Boolean value being false. The logical rule of using the first algorithm only if the Boolean value is true, and the second algorithm otherwise, may be a validation for Configuration File 132. In another example, a validation may specify that a certain output value of an intermediate function must be a certain percentage of an output value of another intermediate function.

Configuration Subsystem 112 may determine fixtures and validations for Configuration File 132 by determining a set of failed requirements based on Failure Types 122. For example, the set of failed requirements corresponds to elements in the set of requirements that Software Program 120 did not achieve in preliminary testing, as indicated by Failure Types 122. The system may determine the set of failed requirements to, for example, include functional correctness and syntactical integrity, based on Failure Types 122 including functional errors and syntax errors. Using the set of failed requirements, Configuration Subsystem 112 may determine fixtures or validations corresponding to each failed requirement. For example, Configuration Subsystem 112 may determine that a functional error is due to an incorrect input type to a function in Software Program 120. Configuration Subsystem 112 may, for example, generate a fixture corresponding to the function, restricting input to the function to the correct type. In another example, the output of a first function is causing a second function to generate errors. Configuration Subsystem 112 may address this failed requirement by generating a validation specifying how the first function affects the activation of the second function to avoid the error. The system may use similar processes to determine fixtures and validations that would enforce the set of failed requirements. Using the fixtures and validations designed to cure the set of failed requirements, the system may generate Configuration File 132 to include the fixtures and validation. In some embodiments, Configuration File 132 may contain validations specified by the set of requirements. In some embodiments, Configuration File 132 may be used directly to test Software Program 120 for adherence to the fixtures and validations listed. For example, the system may identify errors in Software Program 120's execution that relate to a fixture or validation in Configuration File 132 and report the errors to a user.

Using Configuration File 132, the system (e.g., Test Case Generation Subsystem 114) may generate a plurality of test cases (e.g., Test Cases 134). In some embodiments, each test case in Test Cases 134 contains a set of parameters and an endpoint. Parameters in Test Cases 134 include values for input features and a set of independent program states in the software program. An independent program state in the software program is a program state not controlled through an intermediate process of the program during execution. An independent program state may logically relate only to the input values. By contrast, a dependent program state is controlled and logically follows from an intermediate process of the program during execution. A dependent program state is determined by one or more independent program states or input values. Parameters in Test Cases 134 simulate an input that Software Program 120 is designed to correctly handle. Used together with endpoints, parameters of Test Cases 134 examine whether Software Program 120 responds correctly to given input values and independent program states to produce the desired dependent program states and output values. Endpoints in Test Cases 134 include values for outputs of the software program and values for a set of dependent program states. The dependent program states derive their value from the independent program states and input values. Output values are generated using input values, independent states, or dependent states in any combination, depending on the needs of Software Program 120.

An endpoint, containing values for dependent program states and output values, corresponds to a set of parameters in the same test case in Test Cases 134. The values of the endpoint are derived from the values of the parameters, and taken together, the parameters and endpoints capture intended relations from input values and independent program states to dependent program states and output values. The parameters and endpoints of Test Cases 134 are designed with the fixtures and validations of Configuration File 132 in mind. Test Case Generation Subsystem 114 may generate the parameters and endpoints of Test Cases 134 in sequence. First, Test Case Generation Subsystem 114 may select input values and independent program states that satisfy the fixtures of Configuration File 132. For example, the system may perform a random sampling of the feature space defined by each fixture in Configuration File 132 to generate the parameters of a test case. This ensures that all the input values and independent programming states are correct in type and value for appropriate processing by Software Program 120. Using parameters thus generated, Test Case Generation Subsystem 114 uses the validations of Configuration File 132 to generate dependent programming states such that the dependent programming states relate to the independent programming states in a manner satisfying the logical rules of the validations. For example, validations in Configuration File 132 may stipulate that an input feature to a second function has the value of false if the output value of a first function is less than a threshold. In response to the output of a first function being less than the threshold, which may be computed using the input values and independent programming states, the system may cause the input feature to the second function, a dependent programming state, to have a value of false. The system may use similar processing of other validations in conjunction with parameters of the test case to generate dependent programming states. Using a combination of input values, independent programming states, or dependent programming states, the system may determine correct output values that result from the correct processing of input values and programming states satisfying the set of requirements. For each test case in Test Cases 134, the system may generate the parameters to satisfy the fixtures of Configuration File 132, and generate the endpoints as a consequence of the parameters, while satisfying the validations governing the relations from the parameters to the endpoints.

Using Test Cases 134, the system may regulate the software program to adhere to the set of requirements. The regulation may take the form of causing a software program to execute according to the parameters of a test case, comparing the results of the execution with the endpoints specified by the test case, and recording discrepancies to inform updates to the software program. For example, the regulation of software programs (e.g., using Testing Subsystem 116) may take the form of a process as described below. Testing Subsystem 116 may use Test Cases 134 to determine flaws in Software Program 120 in execution, which can create insight on how to further tune the program to satisfy the set of requirements. For example, the system may cause Software Program 120 to activate and process the input values of a test case in Test Cases 134. Where appropriate, Testing Subsystem 116 also causes Software Program 120 to use the independent programming states as specified by the test case.

Testing Subsystem 116 may compare the dependent programming states and output values generated by Software Program 120 in response to the parameters of the test case with corresponding endpoints described by the test case. The endpoints may contain values for one or more dependent programming states and/or output values, and may represent the intended results of the processing by Software Program 120 of the parameters of the test case where the endpoint is found. For example, the endpoint may be defined by relations from the parameters of the test case in accordance with fixtures and/or validations of a configuration file (e.g., Configuration File 132). In some embodiments, the fixtures or validations used to define or regulate the endpoint may be explicitly stated and stored in the test case. In some embodiments, the endpoint may specify a value for a dependent programming state. For example, the endpoint may describe a value generated by an intermediate function of Software Program 120, the value being used to inform a separate function which leads to the output value of Software Program 120 eventually. In some embodiments, where Software Program 120 is an API program, the endpoint may, for example, specify a data source from which an intermediate value may be derived. Alternatively or additionally, the endpoint may describe a format, a type, a value range, or a logical requirement for an intermediate value or an intermediate programming state. In some embodiments, the endpoint may specify a value, type, source or logical requirement for the output value of Software Program 120. The restrictions on dependent programming states or output values for the endpoint may be due to fixtures that directly limit the range of acceptable values, types and formats for intermediate programming states and output values, or due to validations that enforce logical relations from the parameters of a test case to the endpoint.

Testing Subsystem 116 may compare each intermediate programming state and each output value as generated by Software Program 120 to the requirements of the endpoint. Each intermediate programming state and output value must satisfy the descriptions of the endpoint, if any. Testing Subsystem 116 may compare an intermediate programming state against all requirements in the endpoint representing that programming state. For example, Testing Subsystem 116 may verify that the programming state generated by Software Program 120 has a value in the range permitted by the endpoint, that it is of a type described by the endpoint, and that it uses data from the source specified by the endpoint. The intermediate programming state must satisfy all requirements listed by the endpoint, and any deviation may cause Testing Subsystem 116 to conclude that Software Program 120 has failed the test case.

In response to an intermediate programming state or output value failing to meet the requirements of the test case, Testing Subsystem 116 may record the endpoint that caused the failure. For example, Testing Subsystem 116 may record each error of Software Program 120 during its testing by the set of test cases in association with an endpoint for each error. For example, the endpoint may cause one or more errors of Software Program 120 during testing, due to an intermediate programming state being of an incorrect type, an inappropriate data format, and a missing value. In some embodiments, Testing Subsystem 116 may record the endpoint as a failure point for Software Program 120 based on its incorrect execution. In some other embodiments, Testing Subsystem 116 may record additional information with the endpoint as a point of failure for Software Program 120, the additional information indicating a cause of the failure. For example, Testing Subsystem 116 may record that Software Program 120 failed the test case due to an intermediate programming state being of an incorrect type, an inappropriate data format, and/or a missing value. In some embodiments, Testing Subsystem 116 may record the reason for failure to be a fixture or validation associated with the endpoint (e.g., Validation 208). Using the information on failures of Software Program 120, Testing Subsystem 116 may identify logical errors or other functional defects within Software Program 120 and may modify the program accordingly. For example, Testing Subsystem 116 may identify a source of syntax errors based on one or more endpoints generating failures of a syntax error type.

Testing Subsystem 116 may search the software code of Software Program 120 to identify one or more errors within the code causing the errors for adjustment. In another example, Testing Subsystem 116 may identify one or more functional errors due to failures on one or more endpoints. Testing Subsystem 116 may correspondingly modify one or more functions in Software Program 120 to alter the logic of the functions to adhere more precisely to validations or fixtures specified in the configuration file. In some embodiments, Testing Subsystem 116 may test the modified Software Program 120 using the same process as above. The system may, for example, use Test Cases 134 to repeatedly identify failure points and modify Software Program 120 until Software Program 120 performs at or above a threshold performance metric. For example, Testing Subsystem 116 may require Software Program 120 to pass all of Test Cases 134. The iterative process of updating Software Program 120 using Test Cases 134 to satisfy requirements as embodied by Configuration File 132 may be referred to as regulating Software Program 120 using Test Cases 134.

FIG. 2 shows an example test case for a software program, of the same type as Test Cases 134 testing Software Program 120 as described above. The test case contains two parameters: Parameter 202 and Parameter 204, and an endpoint: Endpoint 206. Together, they define one test case with a set of parameters that ought to result in an endpoint. Software Program 120, or an analogous program, may be tested using this test case by causing the program to process Parameter 202 and Parameter 204 as inputs and verifying whether the programming states and output values resulting from such processing matches with the intended result described by Endpoint 206.

Parameter 202 may be an input value for a variable used by Software Program 120. Its type may be an API header, and its name may be "Accept". The type and the name of Parameter 202 inform the test case as to which input is to use the value provided by Parameter 202. Each input of Software Program 120 may have a unique combination of name and type, and the input is identified by its name and type such that Software Program 120 uses the correct value for each input. In the same test case as Parameter 202 is Parameter 204. This may be an independent programming state. For example, the value for Parameter 204 indicates a source (e.g., a database) from which data can be acquired. Parameter 204 is of the type "Path". In some embodiments, Parameter 204 may not be used directly as an input to Software Program 120, but its value may inform one or more intermediate programming states relevant to the execution of Software Program 120. For example, Parameter 204 may indicate the database from which a moving average can be computed. One or more functions in Software Program 120 may access the path described by Parameter 204, but Parameter 204 may not be a direct input to Software Program 120, for example. In some embodiments, Parameter 204 may, for example, specify a pattern of activation for a neural network. In another embodiment, Parameter 204 may specify a type of function used to achieve a certain outcome as part of Software Program 120. For example, Parameter 204 may specify an algorithm to be used by a clustering machine learning model.

The system may cause Software Program 120 to execute using the parameters specified by a test case, for example Parameter 202 and Parameter 204. As shown on FIG. 2, Parameter 202 and Parameter 204 respectively comprise an API header and a path to a data source. The system may cause Software Program 120 corresponding to Parameter 202 and Parameter 204, which may be an API program, to process input values and independent programming states as specified by Parameter 202 and Parameter 204 respectively. Software Program 120 may accordingly use its associated hardware components and software functions to process the input values and independent programming states according to the instructions for computer-readable media as defined by its programming. The result is that Software Program 120, in a deterministic manner, generates dependent programming states and output values as a result of the input values and independent programming states and its programming.

The system may compare the dependent programming states and output values output by Software Program 120 in response to Parameter 202 and Parameter 204 with corresponding endpoints described by the test case, such as Endpoint 206. Endpoint 206 may contain values for one or more dependent programming states and/or output values, and may represent the intended results of the processing by Software Program 120 of Parameter 202 and Parameter 204. For example, Endpoint 206 may be defined by relations from Parameter 202 and Parameter 204 in accordance with fixtures and/or validations of a configuration file (e.g., Configuration File 132). In some embodiments, the fixtures or validations used to define or regulate Endpoint 206 may be explicitly stated and stored in the test case, such as Validation 208 shown on FIG. 2. In some embodiments, Endpoint 206 may specify a value for a dependent programming state. For example, Endpoint 206 may describe a value generated by an intermediate function of Software Program 120, the value being used to inform a separate function which leads to the output value of Software Program 120 eventually. In some embodiments, where Software Program 120 is an API program, Endpoint 206 may, for example, specify a data source from which an intermediate value may be derived. Alternatively or additionally, Endpoint 206 may describe a format, a type, a value range, or a logical requirement for an intermediate value or an intermediate programming state. In some embodiments, Endpoint 206 may specify a value, type, source or logical requirement for the output value of Software Program 120. The restrictions on dependent programming states or output values for Endpoint 206 may be due to fixtures that directly limit the range of acceptable values, types and formats for intermediate programming states and output values, or due to validations that enforce logical relations from Parameter 202 and Parameter 204 to Endpoint 206.

The system may compare each intermediate programming state and each output value as generated by Software Program 120 to the requirements of Endpoint 206. Each intermediate programming state and output value must satisfy the descriptions of Endpoint 206, if any. The system may compare an intermediate programming state against all requirements in Endpoint 206 representing that programming state. For example, the system may verify that the programming state generated by Software Program 120 has a value in the range permitted by Endpoint 206, that it is of a type described by Endpoint 206, and that it uses data from the source specified by Endpoint 206. The intermediate programming state must satisfy all requirements listed by Endpoint 206, and any deviation may cause the system to conclude that Software Program 120 has failed the test case. In response to an intermediate programming state or output value failing to meet the requirements of the test case, the system may record the endpoint that caused the failure. For example, the system may record each error of Software Program 120 during its testing by the set of test cases in association with an endpoint for each error. For example, Endpoint 206 may cause one or more errors of Software Program 120 during testing, due to an intermediate programming state being of an incorrect type, an inappropriate data format, and a missing value. In some embodiments, the system may record Endpoint 206 as a failure point for Software Program 120 based on its incorrect execution. In some other embodiments, the system may record additional information with Endpoint 206 as a point of failure for Software Program 120, the additional information indicating a cause of the failure. For example, the system may record that Software Program 120 failed the test case due to an intermediate programming state being of an incorrect type, an inappropriate data format, and/or a missing value. In some embodiments, the system may record the reason for failure to be a fixture or validation associated with Endpoint 206 (e.g., Validation 208). Using the information on failures of Software Program 120, the system may identify logical errors or other functional defects within Software Program 120 and may modify the program accordingly. For example, the system may identify a source of syntax errors based on one or more endpoints generating failures of a syntax error type. The system may search the software code of Software Program 120 to identify one or more errors within the code causing the errors for adjustment. In another example, the system may identify one or more functional errors due to failures on one or more endpoints. The system may correspondingly modify one or more functions in Software Program 120 to alter the logic of the functions to adhere more precisely to validations or fixtures specified in the configuration file. In some embodiments, the system may test the modified Software Program 120 using the same process as above.

Figure 3:
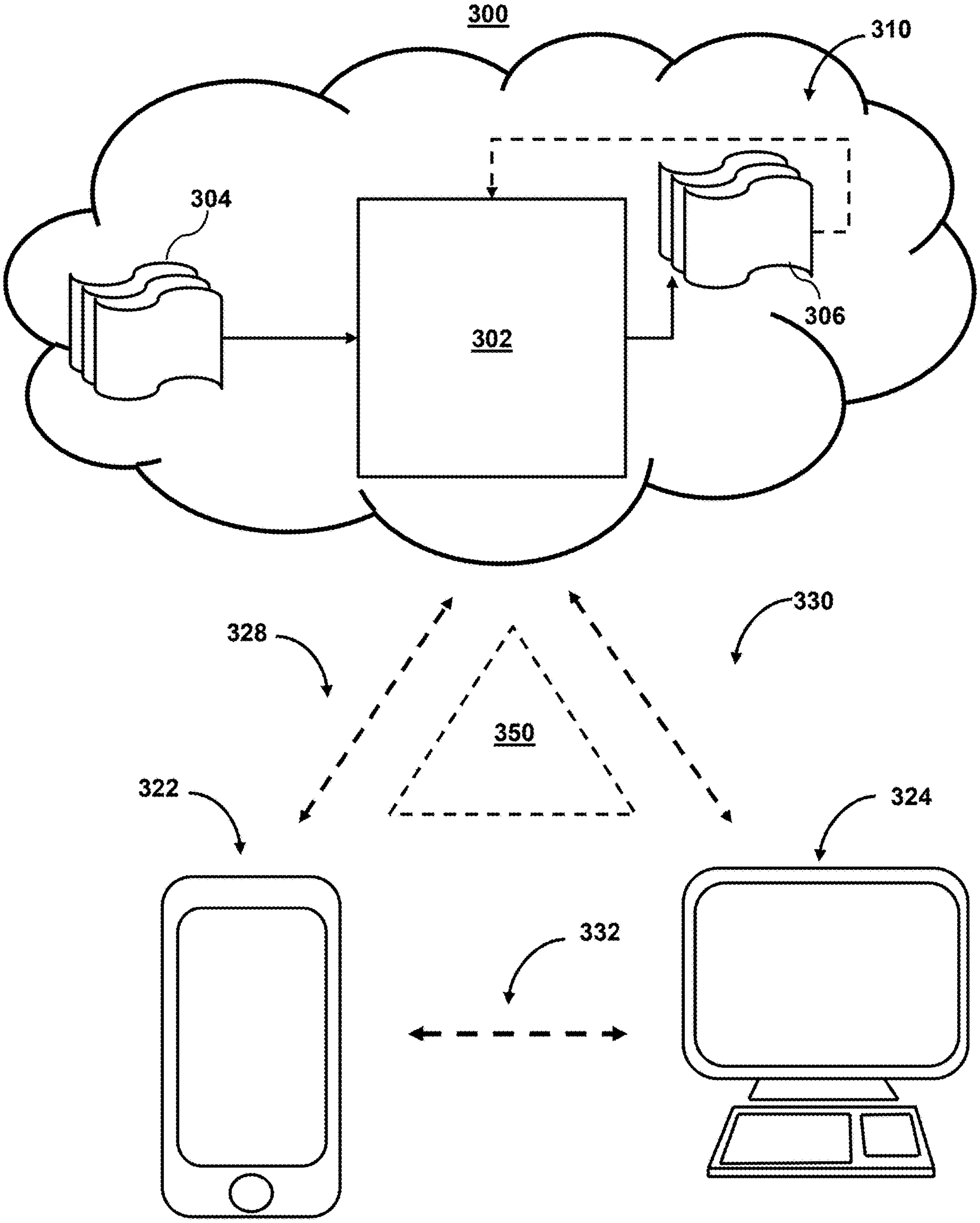
FIG. 3 shows illustrative components for a system for designing a testing process for a software program, in accordance with one or more embodiments.

FIG. 3 shows illustrative components for a system used to communicate between the system and user devices and collect data, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., software code, test cases for software testing, failure instances, or errors during execution).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the Machine learning model to classify the first labeled feature input with the known prediction (e.g., predicting a failure type for a test case during the testing of a software program).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. The output of the model (e.g., model 302) may be used to generate test cases from figuration files, for example.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDOS protection, and API layer 350 may use RESTful APIs as standard for external integration.

Figure 4:
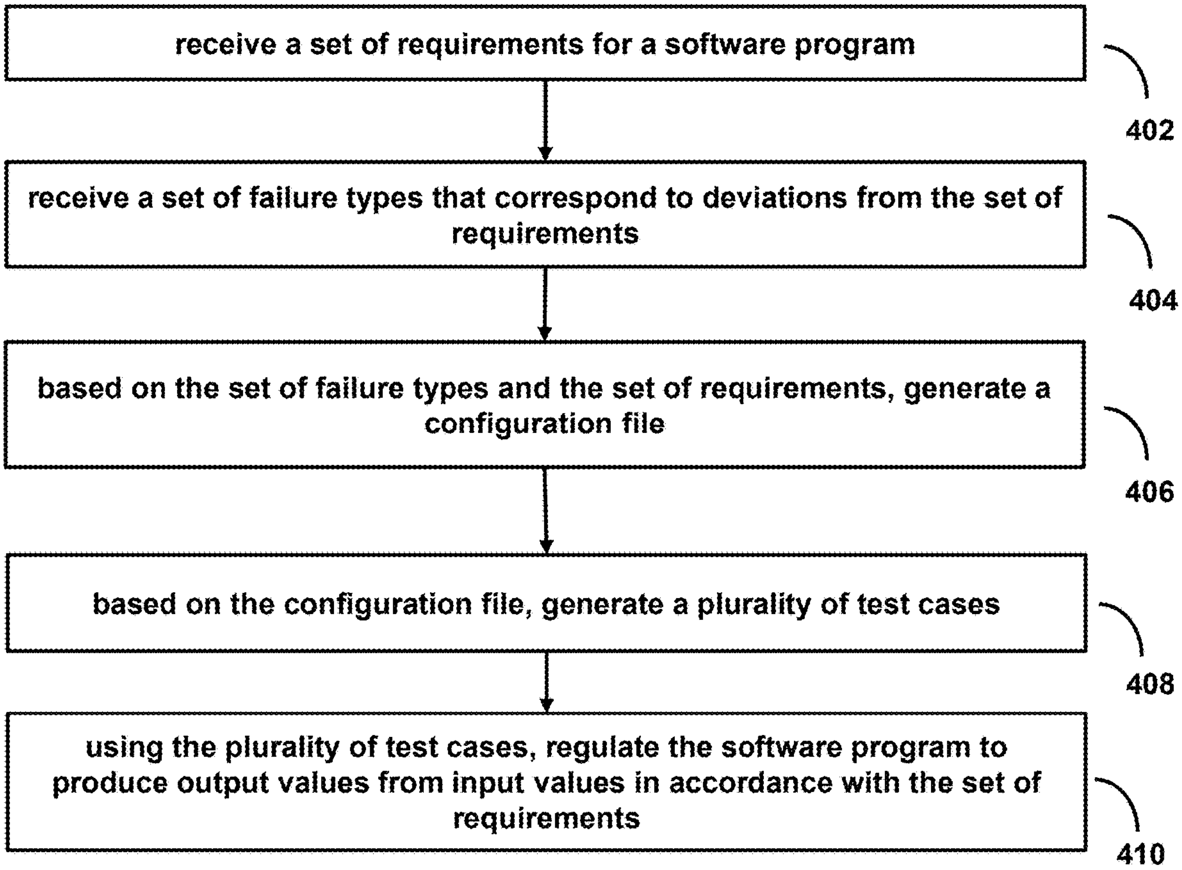
FIG. 4 shows a flowchart of the steps involved in designing a testing process for a software program, in accordance with one or more embodiments.

FIG. 4 shows a flowchart of the steps involved in generating test cases for designing a testing process for a software program, in accordance with one or more embodiments. For example, the system may use process 400 (e.g., as implemented on one or more system components described above) in order to collect and process data about users, train Machine Learning Models, extract explainability vectors, and select and recombine features.

At step 402, process 400 (e.g., using one or more components described above) receives a set of requirements for a software program. The system may be used to test a software program (e.g., Software Program 120). For example, the system may receive a set of requirements for the software program, and the program is to be tested and/or modified to meet the set of requirements. As described herein, the set of requirements includes logical relations between input values and output values for the software program and/or specifications on how the software program processes data. For example, a set of requirements for an API program may specify the data that the API must retrieve in response to particular types of requests, the format in which the output must be delivered, and the databases to be used by the API in retrieving data. For example, the set of requirements may specify a target performance metric describing the accuracy with which the Software Program 120 responds to input values. In some embodiments, the set of requirements is in the format of an Open API specification, detailing the kinds of responses Software Program 120 must make to particular types of requests. A target performance metric specified by the set of requirements may require that Software Program 120 correctly respond to a proportion of all requests used in testing. In some embodiments, the set of requirements may contain one or more logical rules to be included as validations in the testing of Software Program 120.

At step 404, process 400 (e.g., using one or more components described above) receives a set of failure types that correspond to deviations from the set of requirements. The system may receive a set of failure types (e.g., Failure Types 122) corresponding to Software Program 120. The system may, for example, be used for supplemental testing in addition to a first round of initial calibration testing. The system may be designed to fine-tune the software program for particular challenges, and therefore may receive pre-constructed data on the failures of the program. The set of failure types can contain descriptions of types of input-output relationships from the set of requirements that Software Program 120 has failed to meet, or specific input values scenarios where Software Program 120 produced the wrong output. In some embodiments, the set of failure types may refer to categories of input values, output values or intermediate programming states that cause Software Program 120 to generate an error, including an execution error, a syntax error, a functional error, or a performance defect. Failure Types 122 may be generated as a result of preliminary testing (e.g., using Testing Subsystem 116). The preliminary testing may use a set of preliminary test cases identify weaknesses in Software Program 120. Failure Types 122 may include, for example, the preliminary test cases that Software Program 120 failed to pass. In some embodiments, the system may generalize Failure Types 122 to be types of deviations from the set of requirements as shown by the preliminary testing. For example, the system may conclude Failure Types 122 to be a missing-value type, a logical inconsistency type, a functional error type, a performance defect, or a syntax error, among other types. For example, if Software Program 120 failed a test case relating to the value of an output from a function, Failure Types 122 may capture the failed test case as a functional error type.

At step 406, process 400 (e.g., using one or more components described above) generates a configuration file based on the set of failure types and the set of requirements. Based on Failure Types 122, the system (e.g., Configuration Subsystem 112) may generate a configuration file (e.g., Configuration File 132). The configuration file contains fixtures and validations designed to capture the desired relationships between input values, intermediate programming states, and output values. Configuration Subsystem 112 may determine fixtures and validations for Configuration File 132 by determining a set of failed requirements based on Failure Types 122. For example, the set of failed requirements corresponds to elements in the set of requirements that Software Program 120 did not achieve in preliminary testing, as indicated by Failure Types 122. The system may determine the set of failed requirements to, for example, include functional correctness and syntactical integrity, based on Failure Types 122 including functional errors and syntax errors. Using the set of failed requirements, Configuration Subsystem 112 may determine fixtures or validations corresponding to each failed requirement. For example, Configuration Subsystem 112 may determine that a functional error is due to an incorrect input type to a function in Software Program 120. Configuration Subsystem 112 may, for example, generate a fixture corresponding to the function, restricting input to the function to the correct type. In another example, the output of a first function is causing a second function to generate errors. Configuration Subsystem 112 may address this failed requirement by generating a validation specifying how the first function affects the activation of the second function to avoid the error. The system may use similar processes to determine fixtures and validations that would enforce the set of failed requirements. Using the fixtures and validations designed to cure the set of failed requirements, the system may generate Configuration File 132 to include the fixtures and validation. In some embodiments, Configuration File 132 may contain validations specified by the set of requirements. In some embodiments, Configuration File 132 may be used directly to test Software Program 120 for adherence to the fixtures and validations listed. For example, the system may identify errors in Software Program 120's execution that relate to a fixture or validation in Configuration File 132 and report the errors to a user.

At step 408, process 400 (e.g., using one or more components described above) generates a plurality of test cases based on the configuration file. Using Configuration File 132, the system (e.g., Test Case Generation Subsystem 114) may generate a plurality of test cases (e.g., Test Cases 134). In some embodiments, each test case in Test Cases 134 contains a set of parameters and an endpoint. Parameters in Test Cases 134 include values for input features and a set of independent program states in the software program. An independent program state in the software program is a program state not controlled through an intermediate process of the program during execution. An independent program state may logically relate only to the input values. By contrast, a dependent program state is controlled and logically follows from an intermediate process of the program during execution. A dependent program state is determined by one or more independent program states or input values. Parameters in Test Cases 134 simulate an input that Software Program 120 is designed to correctly handle. Used together with endpoints, parameters of Test Cases 134 examine whether Software Program 120 responds correctly to given input values and independent program states to produce the desired dependent program states and output values. Endpoints in Test Cases 134 include values for outputs of the software program and values for a set of dependent program states. The dependent program states derive their value from the independent program states and input values. Output values are generated using input values, independent states, or dependent states in any combination, depending on the needs of Software Program 120. An endpoint, containing values for dependent program states and output values, corresponds to a set of parameters in the same test case in Test Cases 134. The values of the endpoint are derived from the values of the parameters, and taken together, the parameters and endpoints capture intended relations from input values and independent program states to dependent program states and output values. The parameters and endpoints of Test Cases 134 are designed with the fixtures and validations of Configuration File 132 in mind. Test Case Generation Subsystem 114 may generate the parameters and endpoints of Test Cases 134 in sequence. First, Test Case Generation Subsystem 114 may select input values and independent program states that satisfy the fixtures of Configuration File 132. For example, the system may perform a random sampling of the feature space defined by each fixture in Configuration File 132 to generate the parameters of a test case. This ensures that all the input values and independent programming states are correct in type and value for appropriate processing by Software Program 120. Using parameters thus generated, Test Case Generation Subsystem 114 uses the validations of Configuration File 132 to generate dependent programming states such that the dependent programming states relate to the independent programming states in a manner satisfying the logical rules of the validations. For example, validations in Configuration File 132 may stipulate that an input feature to a second function is has the value of false if the output value of a first function is less than a threshold. In response to the output of a first function being less than the threshold, which may be computed using the input values and independent programming states, the system may cause the input feature to the second function, a dependent programming state, to have a value of false. The system may use similar processing of other validations in conjunction with parameters of the test case to generate dependent programming states. Using a combination of input values, independent programming states, or dependent programming states, the system may determine correct output values that result from the correct processing of input values and programming states satisfying the set of requirements. For each test case in Test Cases 134, the system may generate the parameters to satisfy the fixtures of Configuration File 132, and generate the endpoints as a consequence of the parameters, while satisfying the validations governing the relations from the parameters to the endpoints.

At step 410, process 400 (e.g., using one or more components described above) regulates the software program to produce output values from input values in accordance with the set of requirements.

Testing Subsystem 116 may use Test Cases 134 to determine flaws in Software Program 120 in execution, which can create insight on how to further tune the program to satisfy the set of requirements. For example, the system may cause Software Program 120 to activate and process the input values of a test case in Test Cases 134. Where appropriate, Testing Subsystem 116 also causes Software Program 120 to use the independent programming states as specified by the test case.

Testing Subsystem 116 may compare the dependent programming states and output values generated by Software Program 120 in response to the parameters of the test case with corresponding endpoints described by the test case. The endpoints may contain values for one or more dependent programming states and/or output values, and may represent the intended results of the processing by Software Program 120 of the parameters of the test case where the endpoint is found. For example, the endpoint may be defined by relations from the parameters of the test case in accordance with fixtures and/or validations of a configuration file (e.g., Configuration File 132). In some embodiments, the fixtures or validations used to define or regulate the endpoint may be explicitly stated and stored in the test case. In some embodiments, the endpoint may specify a value for a dependent programming state. For example, the endpoint may describe a value generated by an intermediate function of Software Program 120, the value being used to inform a separate function which leads to the output value of Software Program 120 eventually. In some embodiments, where Software Program 120 is an API program, the endpoint may, for example, specify a data source from which an intermediate value may be derived. Alternatively or additionally, the endpoint may describe a format, a type, a value range, or a logical requirement for an intermediate value or an intermediate programming state. In some embodiments, the endpoint may specify a value, type, source or logical requirement for the output value of Software Program 120. The restrictions on dependent programming states or output values for the endpoint may be due to fixtures that directly limit the range of acceptable values, types and formats for intermediate programming states and output values, or due to validations that enforce logical relations from the parameters of a test case to the endpoint.

Testing Subsystem 116 may compare each intermediate programming state and each output value as generated by Software Program 120 to the requirements of the endpoint. Each intermediate programming state and output value must satisfy the descriptions of the endpoint, if any. Testing Subsystem 116 may compare an intermediate programming state against all requirements in the endpoint representing that programming state. For example, Testing Subsystem 116 may verify that the programming state generated by Software Program 120 has a value in the range permitted by the endpoint, that it is of a type described by the endpoint, and that it uses data from the source specified by the endpoint. The intermediate programming state must satisfy all requirements listed by the endpoint, and any deviation may cause Testing Subsystem 116 to conclude that Software Program 120 has failed the test case.

In response to an intermediate programming state or output value failing to meet the requirements of the test case, Testing Subsystem 116 may record the endpoint that caused the failure. For example, Testing Subsystem 116 may record each error of Software Program 120 during its testing by the set of test cases in association with an endpoint for each error. For example, the endpoint may cause one or more errors of Software Program 120 during testing, due to an intermediate programming state being of an incorrect type, an inappropriate data format, and a missing value. In some embodiments, Testing Subsystem 116 may record the endpoint as a failure point for Software Program 120 based on its incorrect execution. In some other embodiments, Testing Subsystem 116 may record additional information with the endpoint as a point of failure for Software Program 120, the additional information indicating a cause of the failure. For example, Testing Subsystem 116 may record that Software Program 120 failed the test case due to an intermediate programming state being of an incorrect type, an inappropriate data format, and/or a missing value. In some embodiments, Testing Subsystem 116 may record the reason for failure to be a fixture or validation associated with the endpoint (e.g., Validation 208). Using the information on failures of Software Program 120, Testing Subsystem 116 may identify logical errors or other functional defects within Software Program 120 and may modify the program accordingly. For example, Testing Subsystem 116 may identify a source of syntax errors based on one or more endpoints generating failures of a syntax error type.

Testing Subsystem 116 may search the software code of Software Program 120 to identify one or more errors within the code causing the errors for adjustment. In another example, Testing Subsystem 116 may identify one or more functional errors due to failures on one or more endpoints. Testing Subsystem 116 may correspondingly modify one or more functions in Software Program 120 to alter the logic of the functions to adhere more precisely to validations or fixtures specified in the configuration file. In some embodiments, Testing Subsystem 116 may test the modified Software Program 120 using the same process as above. The system may, for example, use Test Cases 134 to repeatedly identify failure points and modify Software Program 120 until Software Program 120 performs at or above a threshold performance metric. For example, Testing Subsystem 116 may require Software Program 120 to pass all of Test Cases 134. The iterative process of updating Software Program 120 using Test Cases 134 to satisfy requirements as embodied by Configuration File 132 may be referred to as regulating Software Program 120 using Test Cases 134.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a set of requirements for a software program, wherein the set of requirements is an Open API specification comprising logical rules linking one or more program states; receiving a set of failure types that correspond to previous deviations from the logical rules in the set of requirements, wherein the set of failure types comprises syntax errors, functional errors, or performance defects; based on the set of failure types and the set of requirements, generating a configuration file, wherein the configuration file comprises fixtures and validations, wherein the fixtures define acceptable ranges for each intermediate state of the software program and wherein the validations describe logical relations between two or more intermediate states of the software program during execution; based on the configuration file, generating a plurality of test cases, wherein the plurality of test cases comprises parameters and endpoints generated based on the configuration file, wherein the parameters and endpoints describe values for intermediate states of the software program; and using the plurality of test cases, regulating the software program to produce output values from input values in accordance with the set of requirements, wherein the output values of the software program comprise verifications of approval decisions for resource access requests.

2. A method comprising: receiving a set of requirements for a software program, wherein the set of requirements comprises logical rules linking input values to output values of the software program; receiving a set of failure types that correspond to previous deviations from the logical rules in the set of requirements; based on the set of failure types and the set of requirements, generating a configuration file, wherein the configuration file comprises fixtures and validations, wherein the fixtures define acceptable ranges for each intermediate state of the software program and wherein the validations describe logical relations between two or more intermediate states of the software program during execution; based on the configuration file, generating a plurality of test cases, wherein the plurality of test cases comprises parameters and endpoints generated based on the configuration file; and using the plurality of test cases, regulating the software program to produce output values from input values in accordance with the set of requirements.

3. The method of any one of the preceding embodiments, wherein the set of requirements additionally comprises a target performance metric for the software program, wherein the target performance metric is a numerical representation of a correctness of outputs of the software program.

4. The method of any one of the preceding embodiments, further comprising: based on the configuration file, generating a plurality of test cases, comprising parameters and endpoints generated based on the configuration file; using the plurality of test cases, regulating the software program to produce output values from input values in accordance with the set of requirements; and determining the software program reaches the target performance metric based on the output values.

5. The method of any one of the preceding embodiments, further comprising generating the set of failure types from failures from preliminary testing of the software program, wherein the set of failure types correspond to deviations from the set of requirements in the preliminary testing.

6. The method of any one of the preceding embodiments, wherein generating the configuration file comprises: generating a set of failed requirements based on the set of failure types and the set of requirements, wherein the set of failed requirements comprises logical relations in the set of requirements related to one or more failure types; based on the set of failed requirements, determining fixtures and validations that would enforce the set of failed requirements; and based on the fixtures and validations, generating the configuration file.

7. The method of any one of the preceding embodiments, wherein the fixtures of the configuration file comprise logical rules constraining each program state in the software program.

8. The method of any one of the preceding embodiments, wherein the validations of the configuration file comprise logical rules specifying relations between one or more program states in the software program.

9. The method of any one of the preceding embodiments, wherein parameters of the plurality of test cases comprise values for input features and a set of independent program states in the software program.

10. The method of any one of the preceding embodiments, wherein endpoints of the plurality of test cases comprise values for outputs of the software program and values for a set of dependent program states in the software program, wherein relations from the set of independent program states to the set of dependent program states are based on validations in the configuration file.

11. The method of any one of the preceding embodiments, wherein generating the plurality of test cases comprises: using the fixtures of the configuration file, generating a plurality of parameters, wherein the plurality of parameters comprises input values for the software program; using the plurality of parameters and the validations of the configuration file, generating a plurality of intermediate states based on the logical relations from input values to intermediate states specified by the validations of the configuration file; and using the plurality of intermediate states and the software program, generating a plurality of endpoints for the plurality of test cases.

12. The method of any one of the preceding embodiments, wherein regulating the software program using the plurality of test cases comprises: causing the software program to process inputs corresponding to the parameters in the plurality of test cases and generate a first plurality of intermediate states and a first plurality of outputs; verify whether the first plurality of intermediate states and the first plurality of outputs satisfy requirements of the endpoints in the plurality of test cases; and in response to detecting one or more intermediate states or outputs not satisfying the requirements of the endpoints in the plurality of test cases, generating a notification comprising the one or more intermediate states or outputs.

13. The method of any one of the preceding embodiments, wherein the set of requirements comprises one or more validations to be included in the configuration file.

14. One or more tangible, non-transitory, computer-readable media storing instructions that, when executed by a data processing apparatus, cause the data processing apparatus to perform operations comprising those of any of embodiments 1-13.

15. A system comprising one or more processors; and memory storing instructions that, when executed by the processors, cause the processors to effectuate operations comprising those of any of embodiments 1-13.

16. A system comprising means for performing any of embodiments 1-13.

What is claimed is:

1. A system for regulating an Application Programing Interface (API) program using intermediate programming-state-detected failures, comprising:

one or more processors memories storing instructions that, when executed by the one or more processors, cause operations comprising:

in connection with transmitting preliminary machine-instructions to an API address of an API program to cause the API program to return a set of results based on the preliminary machine-instructions, deriving a set of failure types, from the set of results, corresponding to deviations from logical rules in a set of Open API specification requirements, linking one or more intermediate programming states of the API program, wherein the set of failure types comprises syntax errors, functional errors, or performance defects;

based on the set of failure types and the set of Open API specification requirements, generating a machine-readable configuration file comprising fixtures and validations, wherein the fixtures define acceptable ranges for each intermediate state of the API program and wherein the validations describe logical relations between two or more intermediate states of the API program during execution;

generating a plurality of machine-instructions that are executable by the API program and derived from the fixtures and the validations part of the machine-readable configuration file, wherein the plurality of machine-instructions comprise parameters and endpoints describing values for intermediate states of the API program; and regulating the API program, via a transmission of the plurality of machine-instructions over a computing network to the API address of the API program, causing the API program to produce output values from input values in accordance with the set of Open API specification requirements, wherein the regulating comprises modifying source code of the API program in response to detecting a first output value corresponding to a first machine-instruction of the plurality of machine-instructions deviating from an expected value associated with an endpoint of the first machine-instruction.

2. A method for regulating a software program using intermediate programming-state-detected failures, comprising:

in connection with transmitting preliminary test cases to an address associated with a software program to cause the software program to return a set of results based on the preliminary test cases, deriving a set of failure types, from the set of results, corresponding to deviations from logical rules in a set of requirements, linking input values to output values of the software program;

based on the set of failure types and the set of requirements, generating a machine-readable configuration file comprising fixtures and validations, wherein the fixtures define acceptable ranges for each intermediate state of the software program and wherein the validations describe logical relations between two or more intermediate states of the software program during execution;

generating a plurality of test cases that are executable by the software program and derived from the fixtures and the validations part of the machine-readable configuration file, wherein the plurality of test cases comprise parameters and endpoints; and regulating the software program, via a transmission of the plurality of test cases over a computing network to the address associated with the software program, causing the software program to produce output values from input values in accordance with the set of requirements, wherein the regulating comprises modifying source code of the software program based on a first output value corresponding to a first test case of the plurality of test cases deviating from an expected value associated with an endpoint of the first test case.

3. The method of claim 2, wherein the set of requirements additionally comprises a target performance metric for the software program, wherein the target performance metric is a numerical representation of a correctness of outputs of the software program.

4. The method of claim 3, further comprising:

determining the software program reaches the target performance metric based on the output values.

5. The method of claim 2, wherein generating the machine-readable configuration file comprises:

generating a set of failed requirements based on the set of failure types and the set of requirements, wherein the set of failed requirements comprises logical relations in the set of requirements related to one or more failure types;

based on the set of failed requirements, determining the fixtures and the validations that would enforce the set of failed requirements; and based on the fixtures and the validations, generating the machine-readable configuration file.

6. The method of claim 2, wherein the fixtures of the machine-readable configuration file comprise logical rules constraining each intermediate program state in the software program.

7. The method of claim 2, wherein the validations of the machine-readable configuration file comprise logical rules specifying relations between one or more intermediate program states in the software program.

8. The method of claim 2, wherein parameters of the plurality of test cases comprise values for input features and a set of independent program states in the software program.

9. The method of claim 8, wherein the endpoints of the plurality of test cases comprise values for outputs of the software program and values for a set of dependent program states in the software program, wherein relations from the set of independent program states to the set of dependent program states are based on the validations in the machine-readable configuration file.

10. The method of claim 2, wherein generating the plurality of test cases comprises:

using the fixtures of the machine-readable configuration file, generating a plurality of parameters, wherein the plurality of parameters comprises input values for the software program;

using the plurality of parameters and the validations of the machine-readable configuration file, generating a plurality of intermediate states based on the logical relations from input values to intermediate states specified by the validations of the machine-readable configuration file; and using the plurality of intermediate states and the software program, generating a plurality of endpoints for the plurality of test cases.

11. The method of claim 2, wherein regulating the software program using the plurality of test cases comprises:

causing the software program to process inputs corresponding to the parameters in the plurality of test cases and generate a first plurality of intermediate states and a first plurality of outputs;

verify whether the first plurality of intermediate states and the first plurality of outputs satisfy requirements of the endpoints in the plurality of test cases; and in response to detecting one or more intermediate states or outputs not satisfying the requirements of the endpoints in the plurality of test cases, generating a notification comprising the one or more intermediate states or outputs.

12. The method of claim 2, wherein the set of requirements comprises one or more validations to be included in the machine-readable configuration file.

13. One or more non-transitory computer-readable media comprising instructions that, when executed by one or more processors, cause operations comprising:

in connection with transmitting preliminary test cases to an address associated with a software program to cause the software program to return a set of results based on the preliminary test cases, deriving a set of failure types, from the set of results, corresponding to deviations from logical rules in a set of requirements, linking input values to output values of the software program;

based on the set of failure types and the set of requirements, generating a machine-readable configuration file comprising fixtures and validations, wherein the fixtures define acceptable ranges for each intermediate state of the software program and wherein the validations describe logical relations between two or more intermediate states of the software program during execution;

generating a plurality of test cases that are executable by the software program and derived from the fixtures and the validations part of the machine-readable configuration file, wherein the plurality of test cases comprise parameters and endpoints; and regulating the software program, via a transmission of the plurality of test cases over a computing network to the address associated with the software program, causing the software program to produce output values from input values in accordance with the set of requirements, wherein the regulating comprises modifying source code of the software program based on a first output value corresponding to a first test case of the plurality of test cases deviating from an expected value associated with an endpoint of the first test case.

14. The one or more non-transitory computer-readable media of claim 13, wherein generating the machine-readable configuration file comprises:

generating a set of failed requirements based on the set of failure types and the set of requirements, wherein the set of failed requirements comprises logical relations in the set of requirements related to one or more failure types;

based on the set of failed requirements, determining the fixtures and the validations that would enforce the set of failed requirements; and based on the fixtures and the validations, generating the machine-readable configuration file.

15. The one or more non-transitory computer-readable media of claim 13, wherein the fixtures of the machine-readable configuration file comprise logical rules constraining each intermediate program state in the software program.

16. The one or more non-transitory computer-readable media of claim 13, wherein the validations of the configuration file comprise logical rules specifying relations between one or more intermediate program states in the software program.

17. The one or more non-transitory computer-readable media of claim 13, wherein parameters of the plurality of test cases comprise values for input features and a set of independent program states in the software program.

18. The one or more non-transitory computer-readable media of claim 17, wherein the endpoints of the plurality of test cases comprise values for outputs of the software program and values for a set of dependent program states in the software program, wherein relations from the set of independent program states to the set of dependent program states are based on the validations in the machine-readable configuration file.

19. The one or more non-transitory computer-readable media of claim 13, wherein generating the plurality of test cases comprises:

using the fixtures of the machine-readable configuration file, generating a plurality of parameters, wherein the plurality of parameters comprises input values for the software program;

using the plurality of parameters and the validations of the machine-readable configuration file, generating a plurality of intermediate states based on the logical relations from input values to intermediate states specified by the validations of the machine-readable configuration file; and using the plurality of intermediate states and the software program, generating a plurality of endpoints for the plurality of test cases.

20. The one or more non-transitory computer-readable media of claim 13, wherein the set of requirements comprises one or more validations to be included in the machine-readable configuration file.

* * * * *